(12) United States Patent
Mankovskii

(10) Patent No.: US 9,906,405 B2
(45) Date of Patent: Feb. 27, 2018

(54) ANOMALY DETECTION AND ALARMING BASED ON CAPACITY AND PLACEMENT PLANNING

(71) Applicant: CA, INC., New York, NY (US)

(72) Inventor: Serge Mankovskii, San Ramon, CA (US)

(73) Assignee: CA, INC., New York, NY (US)

( * ) Notice: Subject to any disclaimer, the term of this patent is extended or adjusted under 35 U.S.C. 154(b) by 394 days.

(21) Appl. No.: 14/518,811

(22) Filed: Oct. 20, 2014

(65) Prior Publication Data

US 2016/0112245 A1 Apr. 21, 2016

(51) Int. Cl.
| | | |
|---|---|---|
| G06F 15/173 | (2006.01) | |
| H04L 12/24 | (2006.01) | |
| H04L 29/08 | (2006.01) | |
| H04L 29/14 | (2006.01) | |
| H04L 29/06 | (2006.01) | |

(52) U.S. Cl.
CPC ........ *H04L 41/069* (2013.01); *H04L 41/0677* (2013.01); *H04L 41/145* (2013.01); *H04L 67/10* (2013.01); *H04L 67/125* (2013.01); *H04L 67/38* (2013.01); *H04L 69/40* (2013.01); *H04L 41/0631* (2013.01)

(58) Field of Classification Search
CPC ...... G06F 11/0712; G06F 11/008; G06F 9/50; G06F 9/4856; G06F 9/5066; G06F 9/5077; G06F 9/45533; G06F 9/455; G06F 9/5011; H04L 47/70; H04L 43/16; H04L 41/0631; H04L 41/145; G06N 5/04; G06Q 10/06; G06Q 10/0639
USPC .............................. 718/1; 709/226; 705/7.25
See application file for complete search history.

(56) References Cited

U.S. PATENT DOCUMENTS

| | | | | |
|---|---|---|---|---|
| 8,479,181 | B2 * | 7/2013 | Andrade | G06F 9/455 |
| | | | | 717/140 |
| 8,738,972 | B1 * | 5/2014 | Bakman | G06F 11/0712 |
| | | | | 714/47.1 |
| 9,244,711 | B1 * | 1/2016 | Kondaveeti | G06F 9/45533 |
| 9,317,327 | B2 * | 4/2016 | Apte | G06F 9/50 |
| | | | | 703/13 |
| 2005/0005012 | A1 * | 1/2005 | Odhner | G06Q 10/06 |
| | | | | 709/226 |
| 2007/0271219 | A1 * | 11/2007 | Agarwal | G06F 11/008 |
| | | | | 707/2 |
| 2008/0228459 | A1 * | 9/2008 | Jiang | H04L 43/16 |
| | | | | 703/13 |
| 2008/0295094 | A1 * | 11/2008 | Korupolu | G06F 9/5066 |
| | | | | 718/1 |
| 2010/0250744 | A1 * | 9/2010 | Hadad | G06F 9/4856 |
| | | | | 709/226 |
| 2011/0202925 | A1 * | 8/2011 | Banerjee | G06F 9/5011 |
| | | | | 718/104 |

(Continued)

*Primary Examiner* — Dustin Nguyen
(74) *Attorney, Agent, or Firm* — Vierra Magen Marcus LLP

(57) ABSTRACT

Operational parameters of a running multiserver data processing system are automatically and repeatedly sampled and compared with constraints defined in a capacity and placement planning specification of the multiserver data processing system. Constraint violations are automatically declared as operational anomalies and, if serious enough, corresponding alarm signals are automatically produced.

23 Claims, 6 Drawing Sheets

(56) References Cited

U.S. PATENT DOCUMENTS

| | | | |
|---|---|---|---|
| 2011/0302578 A1* | 12/2011 | Isci | G06F 9/5077 718/1 |
| 2011/0307291 A1* | 12/2011 | Rolia | G06Q 10/06 705/7.25 |
| 2014/0007093 A1* | 1/2014 | Deshpande | G06F 9/45533 718/1 |
| 2014/0082201 A1* | 3/2014 | Shankari | H04L 47/70 709/226 |
| 2015/0112915 A1* | 4/2015 | Michael | G06N 5/04 706/46 |

* cited by examiner

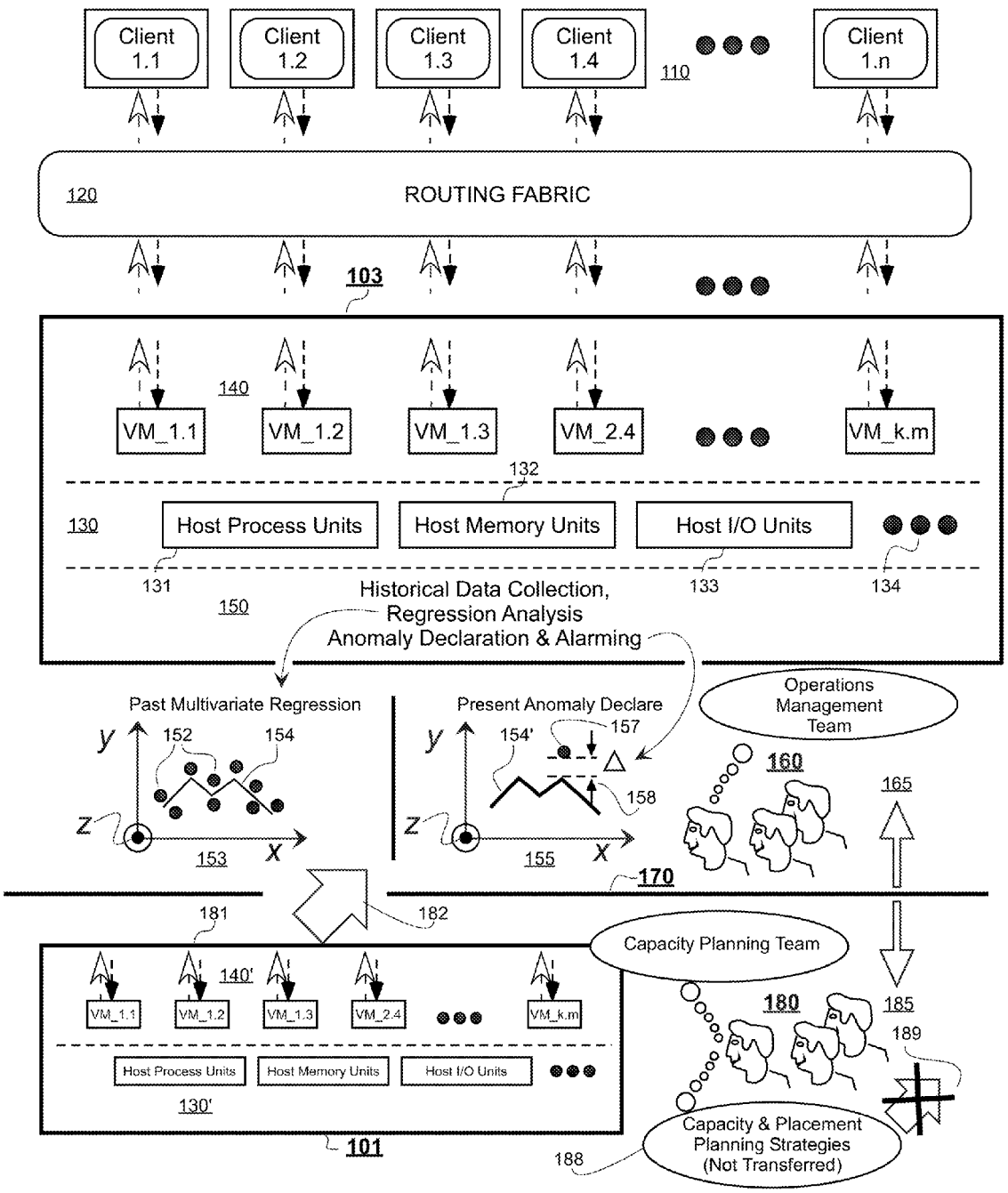

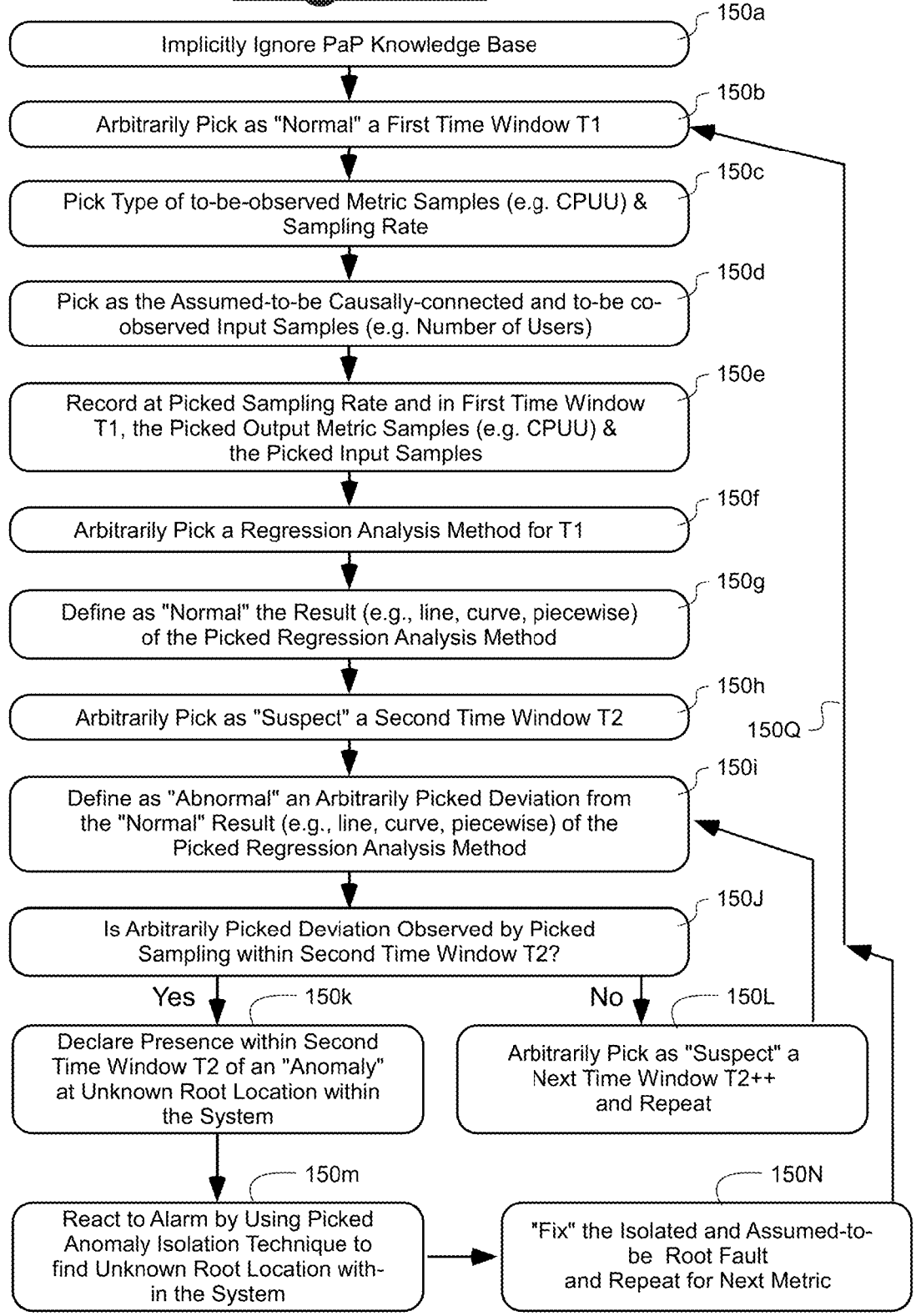

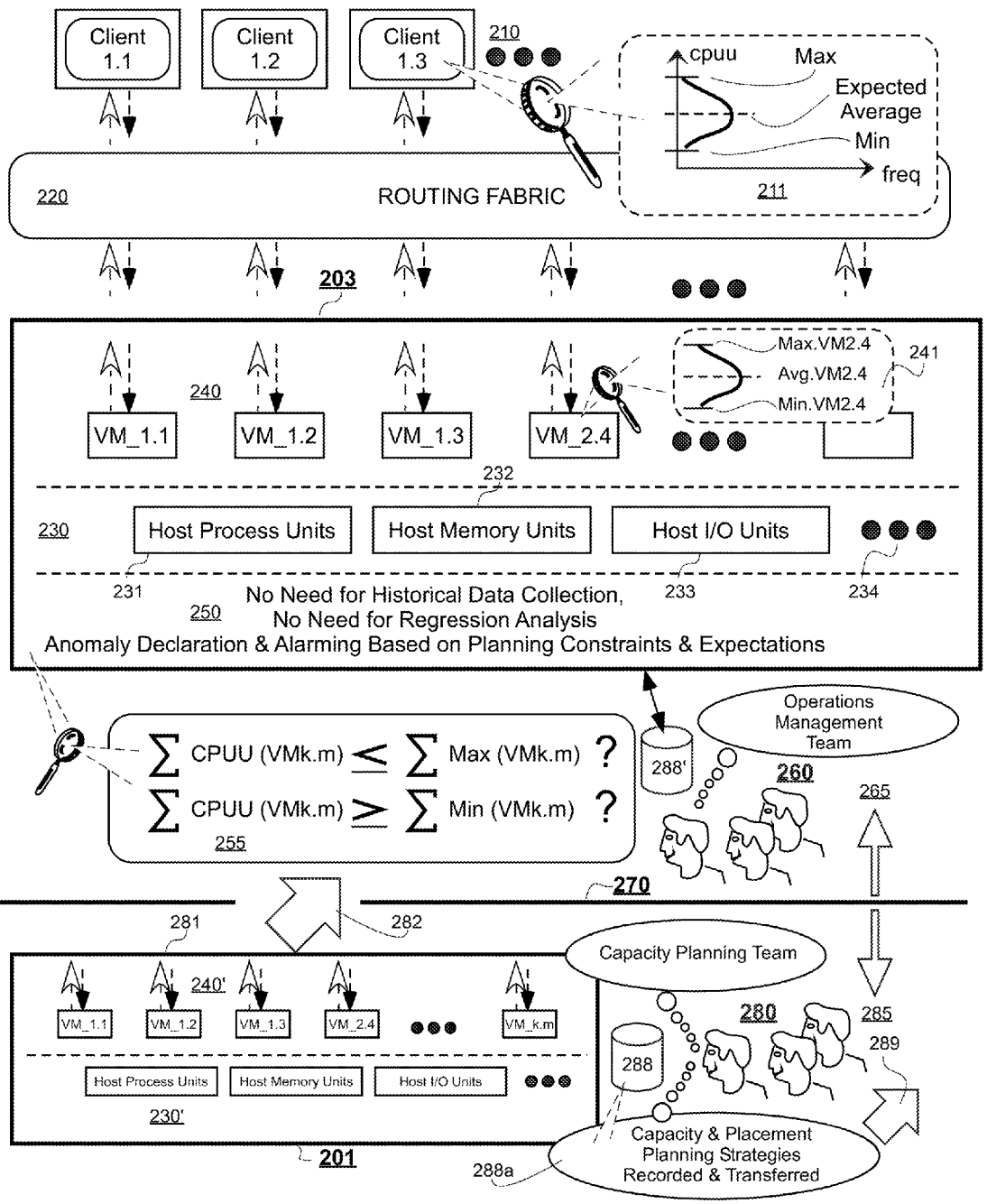

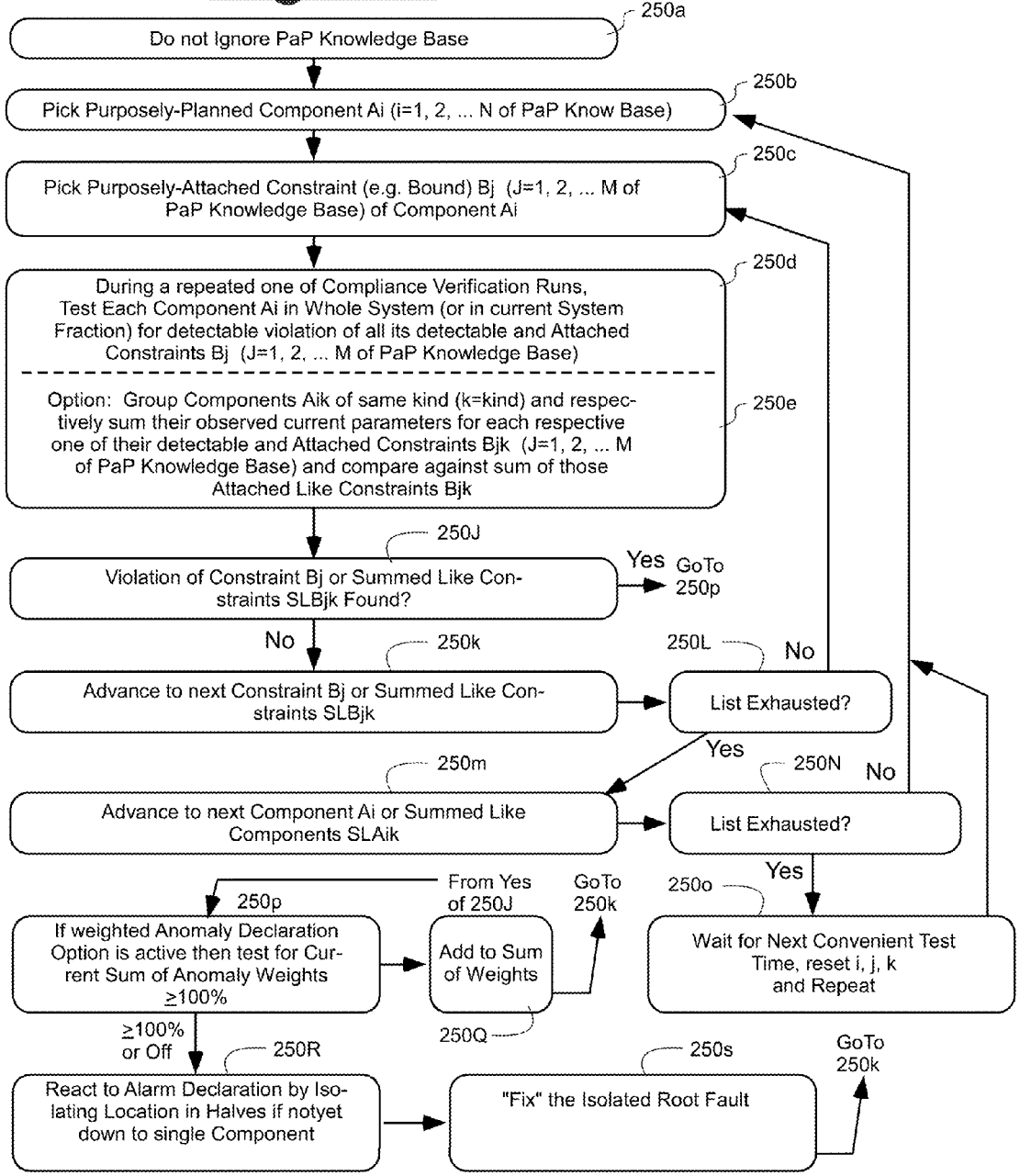

| CONSTRAINT TYPE= Data Transmission Rates (GigaBytes/second) [Peer] [Child] | | | | | | 302 (302a, 302b) |
|---|---|---|---|---|---|---|

| System Layer= Client type 1, set= 1 through N (Layer 210) [Parent] [Peer] [Child] | | | | | | — 310 |
| Transmission type= Egress | | | | | | — 311 |
| Maximum | Minimum | Expected_Average | Anomaly_Weight | Alarm_Level | More .... | — 312 |
| 175 | 3 | 27 | 33% | 10 | | |

| System Layer= Client type 1, set= 1 through N/2 (Layer 210) [Parent] [Peer] [Child] | | | | | | — 320 |
| Transmission type= Egress | | | | | | — 321 |
| Maximum | Minimum | Expected_Average | Anomaly_Weight | Alarm_Level | More .... | — 322 |
| 80 | 1 | 12 | 33% | 10 | | |

| System Layer= Client type 1, set= N/2+1 through N (Layer 210) [Parent] [Peer] [Child] | | | | | | — 330 |
| Transmission type= Egress | | | | | | — 331 |
| Maximum | Minimum | Expected_Average | Anomaly_Weight | Alarm_Level | More .... | — 332 |
| 80 | 1 | 12 | 33% | 10 | | |

• • •

| System Layer= VMM kind k= 1 set= 1 through M (from Layer 240) [Parent] [Peer] [Child] | | | | | | — 340 |
| Transmission type= Egress | | | | | | — 341 |
| Maximum | Minimum | Expected_Average | Anomaly_Weight | Alarm_Level | More .... | — 342 |
| 200 | 3 | 25 | 33% | 10 | | |

| System Layer= VMM kind k= 1 set= 1 through M/2 (Layer 240 left side) [Peer] [Child] | | | | | | — 350 |
| Transmission type= Egress • • • | | | | | | — 351 |
| Maximum | Minimum | Expected_Average | Anomaly_Weight | Alarm_Level | More .... | — 352 |
| 100 | 2 | 12 | 33% | 10 | | |

| System Layer= VMM kind k= 1 set= M/2+1 through M (Layer 240 right side) • • • [Child] | | | | | | — 360 |
| Transmission type= Egress | | | | | | — 361 |
| Maximum | Minimum | Expected_Average | Anomaly_Weight | Alarm_Level | More .... | — 362 |
| 100 | 2 | 12 | 33% | 10 | | |

• • •

| CONSTRAINT TYPE= Data Storage Amount (TeraBytes) [Peer] [Child] | — 305 |
|---|---|

• • •

| CONSTRAINT TYPE= Power Consumption Density (Watts/cm^3) [Peer] [Child] | — 306 |
|---|---|

• • •

| CONSTRAINT TYPE= Coolant Flow Rates [Peer] [Child] | — 307 |
|---|---|

• • •

| CONSTRAINT TYPE= Compartment Temperature [Peer] [Child] | — 308 |
|---|---|

• • •

ANOMALY DETECTION AND ALARMING BASED ON CAPACITY AND PLACEMENT PLANNING

FIELD OF DISCLOSURE

The present disclosure relates generally to multi-server systems such as used in cloud computing where plural virtual machines and/or other resource consuming constructs are placed in respective ones of the physical host units among the multiple-servers for carrying out pre-planned operations. The disclosure relates more specifically to machine-implemented methods of enabling server operators to better determine when an operational anomaly has occurred during day to day operations of a pre-planned multi-server system.

DESCRIPTION OF RELATED TECHNOLOGY

In large-scale multi-server systems such as those used for cloud computing many things can go wrong. Power supplies and/or their fans may fail. Magnetic or other kinds of disk drive systems may crash. Electrical interconnects may develop intermittent opens or shorts. DRAM memory chips may experience unusually large numbers of soft errors. Software program operations may go awry. These are merely illustrative examples.

The operations management teams who manage day to day operations of such large-scale multi-server systems often wish to proactively get ahead of emerging problems so that the latter do not become catastrophic system failures. When a catastrophic system crash occurs, commercial and/or other system users may experience an inability to use mission critical hardware and/or software. Such mission critical system users may include hospitals and/or other medical service providing institutions, banks and/or other financial service providing institutions, police and/or other security service providing organizations and so on. Needless to say, system crashes for such entities may have disastrous consequences.

Given the severity of consequences in some cases, operations management teams want to be automatically alarmed as to when any significant anomalies appear within day to day system operations. However, too much of a good thing; and in particular too high of a false alarm rate, and too many problem chase-afters can significantly interfere with efficient operation of the large-scale multi-server system. More specifically, false alarms can drive up operational costs, exhaust operational personnel and render them insensitive to alarmed situations where there actually is a problem that must be quickly taken care of. On the other hand, it is important to catch "true" problems with use of automatically generated alarms.

The question presents as to how day-to-day operations management teams are to determine that a "true" anomaly is actually present and worthy of alarmed response to as opposed to a false alarmed one? In the past operators have relied on historical performance pictures (performance snapshots), regression analysis (e.g., determining what is "normal" or average based on past performances) and then detecting supposedly-significant deviations from the historical normals (from the regression-produced, "normal" curves).

There are several problems with such a regression analysis and deviation detect approach. First it is not definitively known, and thus primarily guess work as to what should be the observed driving and driven variable(s) of a regression analysis. Should hour of the day be a driving factor? Should it be day of the week? Should it be number of logged-in users or combinations of these and/or other possible driving variables? Then of course there is also the question of what the driven variable(s) of the regression analysis should be. In other words, is there a true cause and effect relationship between selected driving and correspondingly selected driven factors? Possible, but not limiting examples of options for driven factors include CPU utilization, DRAM utilization, disk drive utilization, I/O utilization, power consumption, and so on. Then, for the regression analysis itself, there are many possible algorithms to pick among, including; but not limited to, linear regression, parabolic regression, piece-wise linear regression, piece-wise parabolic regression, higher ordered continuous and/or piece-wise such power series regression formulas or mixes thereof. Additionally, operators may arbitrarily choose to use merely a single driven and a single driving variable, or they may assume plural driving factors for a single driven variable or alternatively multiple driven and driving variables. They may further choose different widths and sampling rates for their regression analysis windows (e.g., as taken over what length of time, at what sampling rate, etc.?). With all of these, it is not definitively known what to pick, and thus it is primarily guess work (falsely justified as being "educated" guess work). It is to be understood that the description given here does not mean that any part or all of this was recognized heretofore.

After specific ones among an astronomically large range of possible regression methods are picked for use with selected driven/driving variables and after operators have produced a "normal" behavior curve (or curves or N-dimensional "normal behavior" surfaces), the question still remains as to what is the amount of deviation and/or what are the number of times that such deviation(s) need to be present in order to declare the corresponding event(s) as an anomaly that is worthy of having an alarm generated therefor and of having follow up work conducted therefor. The follow up work may include identifying the alleged root cause(s) for the declared anomaly and changing the system so as to supposedly "fix" the root cause(s) without creating additional problems.

As already indicated once above, it is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein. In particular it is believed that prior art artisans did not appreciate wholly or at least in part all of the problems associated with reliance on the regression analysis and deviation detect approach. Moreover, it is believed that prior art artisans did not appreciate wholly or at least in part that there are other options to pursue.

SUMMARY

Structures and methods may be provided in accordance with the present disclosure for enabling system operators to monitor for and detect definitive anomalies in system behavior that are worthy of alarming for and/or identifying root causes thereof and changing the system so as to truly fix the root cause(s) without increasing the probability of creating additional problems.

More specifically, in accordance with one aspect of the present disclosure, the team or teams of personnel who perform capacity planning (and resource consumption placements) for a given multi-server system produce (or cause an automatic production of) a complete constraints definition file (or files) that define(s) conditions that are never supposed to happen (in accordance with the capacity and placement planning) for each and every one of the planned and placed components of the planned multi-server machine system. For example, if each physical server housing or rack is planned to have six (6) cooling fans where no more than five and no less than two of the fans are planned to always be turned on, that is a planned operational constraint. If during day-to-day system operations, one of the physical server housings (or racks) is automatically detected to have all six of its cooling fans turned on, that detection is recognized as being a definitive violation of the planning constraints and it is automatically flagged as an anomaly. Moreover, since the inequality condition of $2 \leq Fans\_On \leq 5$ is true for each and every housing (or rack), in cases where there are an integer number N of such housings/racks in the whole of the system, the cumulative inequality condition of $2N \leq Fans\_On \leq 5N$ holds true for the whole of the system and if, during day-to-day system operations, the aggregated status (e.g., summed status) of all the physical server housings/racks in the system is detected to have more than 5N cooling fans turned on, or less than 2N cooling fans turned on, that is detected as being a gross level indication of a violation of (a non-compliance with) the planning constraints. It is automatically flagged as indicating presence of an anomaly in the system as whole. In other words, by aggregating together (e.g., summing) the current status conditions of all of a basically same component (e.g., type 1 cooling fans) and testing that aggregated status (e.g., the sum) against the aggregated ones (e.g., the summed minimums and/or summed maximums) of planned constraints for all N of such basically same components, a single compliance versus non-compliance test can be carried out for each corresponding constraint to thereby determine if the whole of the system is operating in compliance with its planned constraints or violating one or more of those planned constraints. A violation is automatically flagged as indicating the presence of an anomaly. In the case of anomaly presence being flagged for the whole of the system with respect to type 1 cooling fans (as an example), the location of the anomalous housing (or rack or shelf, etc.) may be found by dividing the system into respective halves (or other appropriate fractional portions) and testing each half (or other appropriate fractional portion) for violation of the respective fractional aggregation of constraints, for example $2N/2 \leq Fans\_On \leq 5N/2$. As a variation, in one embodiment, hitting up against the constraint limits, for example, $Fans\_On=2N/2$ OR $Fans\_On=5N/2$ may be optionally considered (where optionally means here this featured being selectively turned on or off for different kinds of components) as an anomaly even though theoretically it is still in compliance with the planned constraints. The mere fact that the aggregate status is touching on an extreme end of an aggregate constraint may be enough to warrant the declaration of an anomaly and the issuance of a corresponding alarm signal. After the appropriate fractional portion (e.g., halves) are tested for aggregate constraint compliance, then for each fractional portion that shows a non-compliance (and/or optionally an abutment against a compliance limit), a further bifurcation or other subdivision is carried out and the test is repeated for violation of the respective fractional constraint, $2N/F \leq Fans\_On \leq 5N/F$, where F is the subdividing factor (e.g., an integer equal to 2 or greater). This can be carried out to whatever level of resolution is desired and the located area or areas that are in violation or near violation of their planned constraints (e.g., a hot swappable unit) are subsequently further inspected and/or replaced or fixed. Thus a method for quickly isolating the location of an anomaly and fixing it is provided. Additionally, there is a logical reason rather than mere hunch work for declaring an observed condition to be an anomaly. The reason is that the resources capacity and placement planning process (hereafter also "CAP planning process") is generally not carried out as an arbitrary one but rather as a well-reasoned one that is typically driven by physicality-based concerns with respect to cost efficiencies, power conservation, reliability maximization and so on. A violation of any of the physicality-based constraints specified by such a well-reasoned process has a high probability of being a true anomaly.

Capacity and placement planning constraints need not be limited to numerical ranges and the ranges need not be continuous ones. For example, the $2N/F \leq Fans\_On \leq 5N/F$ constraint might be further limited by the CAP planning process to also say, $Fans\_On \neq 23$. In other words, the number of turned on fans in the system taken as a whole should never be equal to 23. A violation of this single point exclusion could be declared as an anomaly. As another example, the $2N/F \leq Fans\_On \leq 5N/F$ constraint might be further limited to also or alternatively say, the turned on ones of the fans must be physically spaced apart from one another. In other words, no two or more of the turned on fans are immediately adjacent to one another. A violation of this physical placement requirement could be declared as an anomaly. In one embodiment, the declaration of anomaly presence may in some cases call for multiple violations within a pre-specified period (e.g., at least 2 violations within an hour). In such a case, different ones of the defined planning constraints can have anomaly declaration weights and over-time decay rates attached to them. For example, the $2N/F \leq Fans\_On \leq 5N/F$ constraint might be given a 50% anomaly declaration weight when the system is considered in whole (as opposed to fractionally) while the must-be-spaced-apart constraint might be given a 49% anomaly declaration weight when the system is considered in whole (as opposed to fractionally). Different weights may attach when respective fractional parts of the system are tested for constraint violation(s). In one embodiment, an alarm-worthy anomaly is declared only when the assigned weights of detected violations add up to at least 100%. More specifically, for the given example of 50% and 49%, violation of just those two corresponding constraints within a one hour period is not enough. There has to be at least a third violation within the pre-specified period which adds the missing 1% or more for summing (or otherwise aggregating) to 100% or above. The assigned anomaly declaration weights need not be constant values and instead could be functions of other system variables. In short, a knowledge base that is used by the capacity and placement planning process (CAP planning process) for the whole of the multi-server system is not hidden from, but rather revealed to and/or used by the day-to-day operations management team (and/or an automated enterprise management machine system used by them) to flag out as anomalies, corresponding violations of planning-phase constraints.

While a first and relatively simple example has been given above for the hypothecated type-1 cooling fans, similar anomaly-declaring and alarm-generating rules can be applied to respective and different types of virtual and/or physical other components within a planned multi-server machine system. Here, planning may refer to the placement in each respective physical host unit $H_i$ (i is an integer) of so many physical data processing units (e.g., CPU's) where the per host number is declared to be $N_{i(CPUs)}$, of so many physical memory units (e.g., DRAM cards)=$N_{i(DRAMs)}$, of so many physical hard drive units=$N_{i(HDs)}$, and so on. Moreover, as used here, CAP planning may refer to the placement in each respective physical host unit $H_i$ of so many virtual machines ($N_{i(VMs)}$) of a respective first type (e.g., type-1) that draw on the physical resources of the respective physical host unit $H_i$. The CAP-wise planned virtual machines (VMs) have respective planning constraints logically assigned to each of them (e.g., CPU utilization amounts) and the sums of those constraints can define operational limits for the virtual machinery that executes within the machine system on a day-to-day operational basis. In other words, anomalous behavior by the virtual machinery of the system can be flagged and isolated (e.g., as to location) in a manner similar to the way described above for the exemplary physical machinery parts (e.g., type-1 cooling fans) except that in the VMs case, each physical host may be planned such that it also has so many of type-2 VMs, so many of type-3 virtual machines, and so on (type-4, type-5 etc.) assigned to it by way of the capacity and placement planning process. The pre-supposed constraints of each VM type may be respectively summed (or otherwise aggregated) to define total constraints (e.g., total CPU utilization constraints, total DRAM utilization constraints, etc.) for that VM type as distributed through the multi-server system taken in whole.

Of importance, in one embodiment, there is essentially no resort to use of the regression analysis and deviation detect approach for generating urgent alarms. Thus there is no substantial reliance on mere guess work for such urgent-action alarms. The reasoning and knowledge base that went into the system capacity and placement planning process is implicitly copied over into the day-to-day operations management space whereas it is believed that heretofore that knowledge base was kept hidden from day-to-day operations management teams and not used for anomaly declaration and alarm production.

Other aspects of the disclosure will become apparent from the below detailed description.

BRIEF DESCRIPTION OF THE DRAWINGS

The below detailed description section makes reference to the accompanying drawings, in which:

FIG. 1A is a block diagram schematically showing transfer of responsibility for a multi-server, multi-virtual machines system from a placement and planning team (first team) to a day-to-day operations management team (second team) without transfer of a knowledge base used by the first team to perform their capacity and placement planning actions and also showing use by the second team of a regression analysis and deviation detect approach for declaring anomalies;

FIG. 1B is a flow chart depicting how an anomaly might be declared in the situations of FIG. 1A using a regression analysis and deviation detect approach;

FIG. 2A is a block diagram schematically showing transfer in accordance with the present disclosure of capacity and placement planning data (CAP planning data) from the capacity and placement planning team to the day-to-day operations management team so that the CAP specifications can be used for detecting deviations by the physical and virtual component from the corresponding models used by the capacity and placement planning team;

FIG. 2B is a flow chart depicting how an anomaly might be automatically declared and located in the situation of FIG. 2A using a planning violation approach;

FIG. 3 shows structured records of a database usable with a system in accordance with the present disclosure.

DETAILED DESCRIPTION

Figure 4:
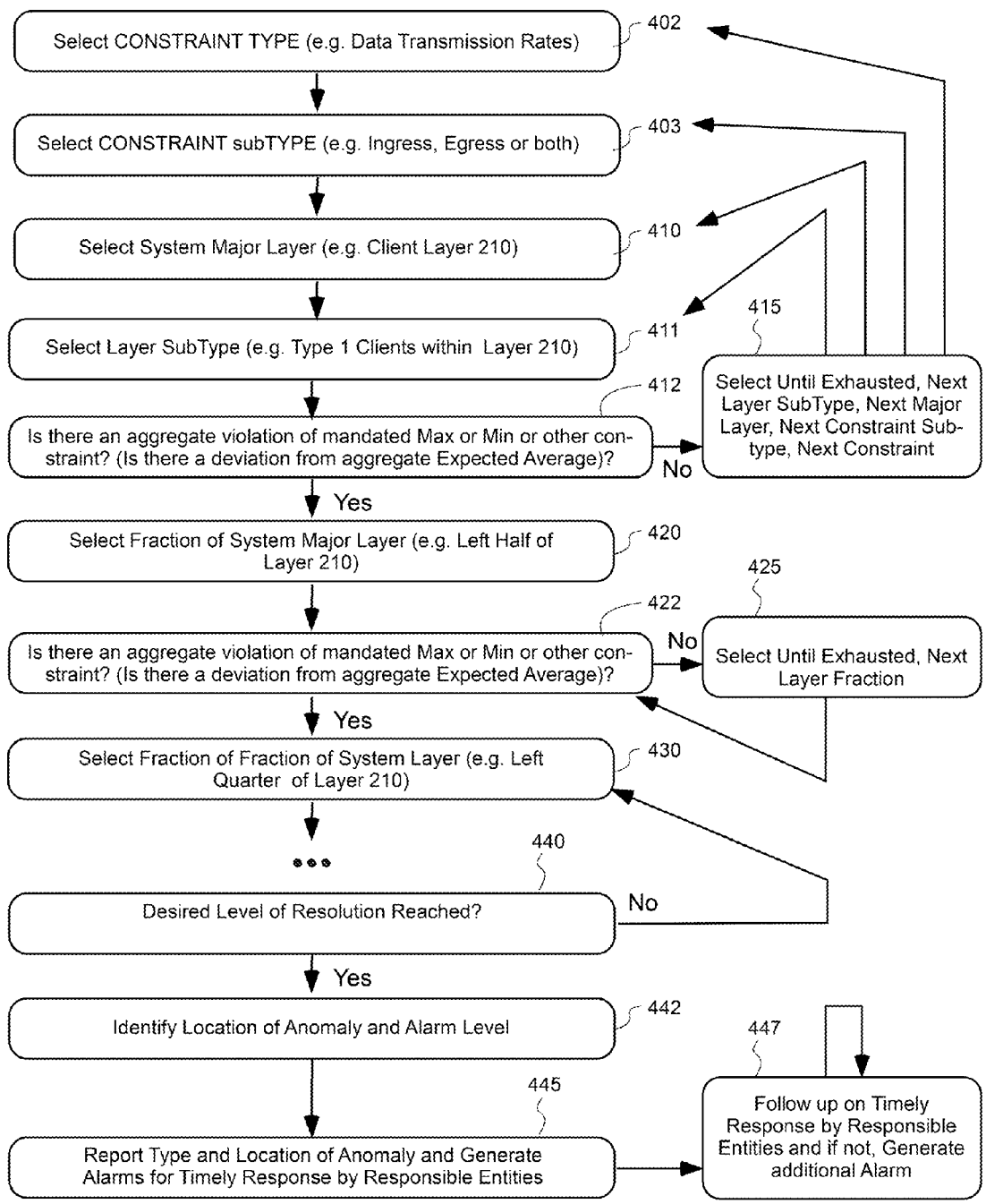
FIG. 4 is a flowchart depicting a machine-implemented method for automatically testing for constraint violations.

FIG. 1A is a block diagram showing an environment 100 wherein transfer of responsibility for a multi-server, multi-virtual machines system 101/103 from a capacity and placement planning (CAP planning) team 180 to a day-to-day operations management team 160 occurs without transfer of all knowledge 188 used by the first team 180 to perform their capacity and placement planning actions. It is to be understood that the CAP planning activities of team 180 produce the planned version 101 of the multi-server, multi-virtual machines system.

Of importance, while FIG. 1A is labeled as "Prior Art Situations", such is not in any way an admission here that ordinary artisans either in the capacity and placement planning arts or in the day-to-day operations management arts or in any other associated art recognized the depicted combination of situations (165 and 185 of FIG. 1A) and understood their implications. The here provided FIG. 1A did not exist in the prior art.

The illustrated situation(s) of FIG. 1A include an above-the-line first one 165 (above line 170) where a day-to-day operations management team 160 has received a pre-packaged, pre-organized arrangement of physical and virtual components. The received package includes a physical resources layer 130 and a virtual resources layer 140. The physical resources layer 130 consists of predetermined finite numbers respectively of specific physical resources such as N1 host data processing units 131 (e.g., CPU's), N2 host memory units 132 (e.g., DRAM and/or Flash memory cards), N3 host I/O units 133 (e.g., SERDES cards) and so on (the rest indicated by dots symbol 134), where N1, N2, N3, etc. can be different integer numbers and each "SERDES card" (as an illustrative example) can provide a predetermined number of high speed serial data transfer channels with corresponding signal serialization and deserialization functionalities and capacities. It is to be understood that these are merely nonlimiting and illustrative examples. More broadly, each pre-planned physical machine is planned to have a finite number of physical components placed therein with respective pre-planned physical limitations and the virtual components within the physical machines are constrained at least by the physical limits of the host physical machine if not also having their own pre-planned constraints. Physical and virtual components placement and planned behaviors for each are based on planning knowledge 188 that the capacity planning team 180 may or may not have fully recorded in a machine-usable manner. The capacity planning team 180 has no apparent reason for passing all of their planning knowledge 188 on to the day-to-day operations management 160 for later use. In other words, for the situations depiction of FIG. 1A a full transfer 189 (drawn as being an X'd out transfer arrow) of the planning knowledge 188 to the day-to-day operations management space (165) generally does not occur because there is no recognized reason for such a transfer 189.

In FIG. 1A, the illustrated virtual resources layer 140 of the day-to-day operating version 103 of the multi-server system may consist of predetermined finite numbers respectively of different kinds of virtual resources such as for example, M1 first virtual machines of a first type (e.g., small capacity VM's), M2 second virtual machines of a second type (e.g., medium capacity VM's), and M3 third virtual machines of a third type (e.g., large capacity VM's) where M1, M2 and M3 can be different integer numbers and each type of virtual machine (VM) can respectively have different planned-for capacities, internal organizations and/or internal virtual components. The virtual machines in layer 140 consume part but not more than the whole of the physical resources of the physical resources layer 130 to perform their respective virtual operations (which are in the end, actually non-abstract physically real operations) and thus at any instant, the sum total of functionalities of the virtual machines cannot exceed the sum total of functional capacities provided by the supporting physical resources layer 130. More specifically, if the total data storage capacity of the physical resources layer 130 is 10 Terabytes then the virtual resources layer 140 cannot sport more than 10 Terabytes of storage. However, and as will be seen, the capacity and placement planning process (188) may include a safety margin that constrains the virtual components of layer 140 to no more than say, 90% of the capabilities of the supporting physical layer 130. Therefore in such an exemplary situation and due to planning constraints, the virtual resources layer 140 should not be able to sport more than a total of 9 Terabytes of storage.

Because the day-to-day operations management team 160 receives their version 103 of the system as being pre-packaged (pre-placed and capacity pre-specified units) having given finite numbers of physical and virtual resources (in layers 130 and 140), the day-to-day operations management team 160 cannot unilaterally increase the system's operational capacity or move the pre-placed components around. However, the operations management team 160 can decide how the given virtual resources are to be allocated to service external clients, for example to service the illustrated external clients layer 110 that is operatively coupled to the multi-server, multi-virtual machines system 103 by way of a variable routing fabric layer 120 (e.g., an internet or extranet). More specifically, team 160 may decide that VM's 1.1, 2.4 and 5.2 (last one not shown) will service Client 1.1, that virtual machines 1.2, 2.5 and 5.3 (last two not shown) will service Client 1.2 and so on. Here, the virtual machine identification of the form VMk.m is given to denote that k is a machine type number and m is a selected one of the Mk plural VM's available to the specified type k.

Referring to layer 150 of the illustrated pre-placed and capacity pre-planned version 103 of the multi-server, multi-virtual machines system, when the day-to-day operations management team 160 receives (via transfer step 182) that version 103, they may be tasked with the problem of monitoring for and detecting anomalous behaviors within the running system 103. The classical response was to rely on multivariate regression. More specifically, during a first time window 153 of arbitrary width and temporal location, one or more to-be-observed and driven, "normal variables" are identified; such as for example CPU utilization (hereafter, also "cpuu"), memory unit utilization (hereafter, also "muu"), I/O resource unit utilization (hereafter, also "iouu"), power consumption, etc. and each of these identified "normal variables" is plotted in correspondence with an associated Y axis while supposedly cross-correlated and driving variables are spotted on a sampling basis along one or more orthogonal axes such as the illustrated X axis and Z axis. The supposedly cross-correlated driving variables of the X axis might be arbitrarily picked to be time (t) while the suppos-edly cross-correlated, second driving variable of the Z axis might be arbitrarily picked to be number of currently online clients (of layer 110). Then, as the system runs under what are assumed to be "normal" conditions, sample points (historical data) 152 are collected and one of possible regression algorithms (e.g., linear, piece-wise linear, parabolic, etc.) is picked to thereby generate a corresponding, best fit regression plot, curve or surface 154.

Next, within a later and "suspect"-worthy time window depicted as 155, a copy 154' of the earlier derived regression plot/surface is provided in the same reference frame (e.g., X, Y and Z axes) and distance 158 between that regression plot/surface 154' and newly observed samples 157 of the picked driven-variable (e.g., CPUU) is measured. If the observed deviation 158 between a newly observed sample 157 and the previously generated regression plot/surface 154' exceeds an arbitrarily picked threshold, the presence of an anomaly is declared. A corresponding alarm signal is automatically generated and responsible members of the operations management team 160 follow up on the alarmed anomaly 157. It is to be noted here, that a similarly deviated sample might have been included as one of the observed samples 152 during the earlier creation (153) of the regression plot/surface 154' and at that time it was considered "normal" whereas now during the deviation detect phase 155 it is considered abnormal. In other words, there is no clear basis for determining what is "normal" and what is abnormal. The demarcation is based on guess work and assumptions (e.g., assumption of Gaussian behavior) as opposed to being based on a knowledge base having traceable to, and physicality-based roots.

Before moving down FIG. 1A to the below line situation 185 (that which is below horizontal line 170), it is worth noting the amount of work and resources that are committed to the regression analysis and deviation detect approach 150. Firstly, data processing resources have to be dedicated to automatically and repeatedly carrying out the regression analysis portion of the method in sequential ones of assumed-to-be-normal operational time windows 153. Further data processing resources have to be dedicated to automatically and repeatedly carrying out the comparison depicted in sequential ones of assumed-to-be-possibly-not-normal operational windows 155 in search for above threshold deviations 158. Then, if an above threshold deviation 158 is found, members of team 160 still do not know what the root cause of the declared anomaly is because the observed-to-be-deviant sample 157 (e.g., a CPU utilization factor greater than what is assumed to be "normal") is not necessarily its own fault but could instead be the result of an unidentified predecessor condition or other failure point. Accordingly, members of team 160 have to either manually, or with aid of diagnostics software, trace backwards in time to try and find the true root cause of the alarmed anomaly 158. There is no guarantee of success for such a hunt for the underlying cause. The underlying premises about the alarmed anomaly 158 being a "true" anomaly could be wrong in the first place and then the whole exercise of hunting down the root cause could be wasteful, or worse yet, it could induce members of team 160 to insert a "fix" into the system 103 where the inserted fix creates new real problems in place of phantom ones that were associated with an improperly declared anomaly 157.

In moving down FIG. 1A to the below line situation 185 (below line 170), it is to be noted that neither of the day-to-day operations management team 160 nor the CAP planning team 180 is inherently aware of a connection between what team 160 does on a day-to-day basis and what team 180 does as a one-time initial configuration of version 101 of the system.

In so far as the capacity and placement planning team 180 is concerned, they are given predetermined cost constraints. They are given limited options with respect to what physical machine resources will be available (e.g., how many servers and what the capacities of their physical internal components, 131-134 will be). They (team 180) are given a description of the client population 110 that is to be serviced and the bandwidths or response times called for to perform predefined data processing operations. In view of this, the CAP planning process team 180 determines that they will need as a first number, say M1 of small sized virtual machines (type 1 VMs), as a second number, M2 of medium sized virtual machines (type 2 VMs) having corresponding intermediate data processing capabilities, and as a third number, M3 of largest sized virtual machines (type 3 VMs) having corresponding maximal data processing capabilities. The CAP planning team 180 will likely have base or root parameters upon which they build the whole of their capacity and placement planning strategies 188. Whether right or wrong, the base or root parameters will be the foundations upon which the rest of the system is built. More specifically, and merely as an example, the capacity and placement planning team 180 might assume that a telecommunications bandwidth of the routing fabric 120 will never exceed 10 Terabytes per second (a hypothetical number here) and as a consequence the data processing capabilities of physical components layer 130 need never exceed 100 Teraflops (also a hypothetical number here). Based on this foundational premise (irrespective of whether it is right or wrong), the placement/capacity planning team 180 goes on to determine how many and what kinds of host processor units 131 they will need, how many and what kinds of host memory units 132 they will need, and so on. They will also similarly use the foundational premise as a basis for determining how many and what kinds of virtual machines (VM's) they will need in layer 140. Inherent in this is the fact that they are simultaneously determining what the maximum (and/or minimum) performance capabilities will be of the respective physical and virtual components (e.g., in terms of resource utilizations such as cpuu's, muu's, iouu's, etc.). When one of these resource utilization constraints or bounds (be it a maximum or a minimum) is violated, that is indicative of a violation of a base assumption made during the placement/capacity planning phase 185 of the system design. It is a truer indication of something having gone wrong than that obtained from guesswork-based regression and deviation analysis 150.

Continuing with the narrative of how the placement/capacity planning phase 185 of system design generally proceeds, after total capabilities requirements are established and then subdivided amongst different numbers (e.g., M1, M2, etc.) of different kinds (k) of virtual components (e.g., VM's), the CAP planning team 180 tries to efficiently place the M1+M2+ . . . +M3 virtual machines (of layer 140') within the available array of physical data processing machines (layer 130') while providing for a rule of thumb margin of safety. In one scenario, the CAP planning team 180 may provide for a 10% margin of safety, where for example, if a given physical server has a data processing capacity of 50 Teraflops, the maximum data processing capacity to be consumed by the there-placed virtual machines will be no more than 45 Teraflops (in other words, 90%). In one embodiment, team 180 places the smallest of the called-for virtual machines (e.g., type 1 VMs) successively in the smallest physical machine first until the 90% margin of safety level is reached therefor and then into the next smallest physical machine until its 90% ceiling is reached, and so on. Then the medium sized of the called-for virtual machines (e.g., type 2 VMs) are successively placed into progressively available ones of the next bigger servers having free space until their 90% levels are reached, and so on. The largest of the called-for virtual machines (e.g., type 3 VMs) are fitted into the largest of the leftover servers. Then it is seen if packing efficiency can be improved by moving smaller VMs into leftover free spaces in the larger servers so as to thereby reduce the total number of servers and/or to increase the margins of safety (of spare capacity) in all the utilized servers.

Once the capacity and placement planning team 180 has achieved its objectives, it keeps for itself the placement/capacity planning strategies 188 used for arriving with the final configuration (version 101) of the planned multi-server, multi-virtual machines system and delivers (step 182) to the day-to-day operations management team 160 only the final result. In other words, the utilized placement/capacity planning strategies 188 are not delivered (indicated by crossed-out step 189) to the operations management team 160 (to the above-line 170 situation). Heretofore there was no reason for doing so. Also heretofore there was no reason for recording the utilized placement/capacity planning strategies 188 as an automatically testable against knowledge base or database.

Referring next to FIG. 2A, like numbers in the 200 century range are generally used for corresponding aspects of FIG. 1A that were denoted with corresponding reference numbers in the 100 century range. Thus a repeat of all details is not necessary here. The physical components layer 230 of the overall system 200 of FIG. 2A is to be understood as comprising at least one of: a plurality of data processing units 231; a plurality of memory units 232; a plurality of input/output communication units (e.g., SERDES cards) 233; a plurality of cooling units (not shown but encompassed in "more" symbol 234); a plurality of power supply units (also not shown and encompassed by symbol 234); a plurality of wired and/or wireless interconnect units (as part of 234) for interconnecting electrical units of layer 230; a plurality of photonic interconnect units (as part of 234) for photonically interconnecting units of layer 230; and so on.

Although not all explicitly depicted in FIG. 2A, it is to be understood that portions of the illustrated system 200 may comprise one or more networks (e.g., signal routing fabrics; internet, extranets, for example 220), respective data processing devices (e.g., 231) each having or being operatively coupled to respective one or more network interfaces (e.g., 233) configured for appropriately interfacing with the networks they are coupled to; one or more non-volatile storage devices (e.g., magnetic, optical, phase change and/or electrostatic based data storage devices, for example 232); and they each may have one or more processor units (e.g., CPU's) in operative communication with their respective network interfaces and their respective one or more non-volatile storage devices for thereby receiving requests and/or outputting responses via their respective network interfaces and/or storing data developed during intermediate processing. The client machines layer(s) 210 and the interconnect layer(s) 220 that are external of the day-to-day operational multiserver 203 are often part of the pre-planned operational environment in which the capacity and placement planning team 280 plans for the operational multiserver 203 to run. Accordingly the capacity and placement planning specification 288 may include predetermined constraints for specified components of the client machines layer(s) 210 and the interconnect layer(s) 220 and violations of these constraints may also be flagged as localized anomalies. Moreover, the supporting infrastructure that provides operational support for the data processing portions of the day-to-day operational multiserver 203 are often part of the pre-planned operational environment in which the capacity and placement planning team 280 plans for the operational multiserver 203 to run. Accordingly the capacity and placement planning specification 288 may include predetermined constraints for specified components of the supporting infrastructure where the latter may include power supplies, cooling units, security devices (e.g., locked cabinet doors) and the like. Violations of these constraints may also be flagged as localized anomalies.

The virtual components layer 240 of the overall system 200 of FIG. 2A is to be understood as comprising at least one of: a plurality of virtual computing machines (VM's, e.g., Java machines), plurality of virtual memory units (not shown but encompassed in the "more" symbol of layer 240); a plurality of virtual interconnect units (encompassed in the "more" symbol) configured to virtually provide data routing between other units of the virtual components layer 240; and a plurality of virtual I/O units configured to communicate by way of the physical layer I/O units 233.

Given the above as a foundation, a more detailed examination is provided for how the placement/capacity planning team (now denoted as 280 for corresponding situation 200) might perform their capacity and placement planning tasks 288a. In accordance with the present disclosure, all or substantially most of the plannings 288a are recorded and stored in an organized manner in a respective relational database 288. The plannings 288a may be stored in the form of a knowledge base having knowledge base rules. More specifically and for example, the team 280 might base all their plannings on an assumption that there will never be in client layer 210 more than C number (e.g., C=1000) of client devices simultaneously demanding services from their being-planned, multiserver system 201/203. They may also determine that none of the maximum of C number of client devices (e.g., C=1000) will ever have a CPU utilization bandwidth denoted as CPUUmax such that total service request demand on their being-planned, multiserver system 201/203 will never exceed C times CPUUmax.

Aside from testing for violation of hard constraints and/or for bumping up against the extremes of constraint ranges (e.g., at maximum or at minimum) it is within the contemplation of the present disclosure to automatically and repeatedly keep track of trends that are heading toward bumping up against the extremes of constraint ranges (aggregate ones or individualized ones) and then going beyond those extremes into constraint violation realm. The trending-toward violation detection process may utilize pre-specified thresholds for when the automated tracking kicks in, for example starting at 10% below maximum and heading higher or starting at 7% above minimum and heading lower. These are just examples and it is to be understood that the thresholds for triggering automatic tracking may be expressed as absolute numbers or as variable formulas. The thresholds and/or algorithms used for turning off automatic tracking may be different from those used to turn trend tracking on. The turning on and/or off of such trend tracking may alternatively or additionally be rate based. For example, trend tracking may be governed by knowledge base rules and one of those rules might provide: IF Less than 10% below Attribute Maximum and Rate of Moving toward Attribute Maximum is greater than 2% per day Then Turn on trend tracking for the attribute ELSE Do not turn on trend tracking. The point at which an alarm report is output to a responsible entity may be different from when trend tracking begins. For example, one of the knowledge base rules might provide: IF Rate of Moving toward Attribute Maximum is consistently greater than 2% per day AND tracked Attribute is now 6% below maximum or higher THEN Issue Warning Alarm to pre-specified Responsible Entities.

Aside from basing alarms on violations of hard constraints (hard constraints on planned system capabilities) and/or trendings toward breaching such hard constraints, further ones of generated alarms or warnings may be based on excessive variations from certain planning expectations and/or trendings toward excessive variations. An example of a planning expectation may be one that indicates what the average service request demand on the being-planned, multiserver system 201/203 will be. Say for example that each client (of layer 210) is expected to have an average client-side CPU utilization bandwidth denoted as CPUUavg. In that case, the average service request demand on their being-planned, multiserver system 201/203 should not be more than C times CPUUavg. A violation of a soft expectation such as average capacity load is not the same as a violation of a hard constraint such as maximum CPU utilization bandwidth. Nonetheless, in accordance with one aspect of the present disclosure, detected violations of soft expectations (e.g., averages or means or medians) and/or automatically and repeatedly detected rapid trendings toward excessive variation from expectations (where knowledge base rules define what is deemed excessive for respective system attributes) may serve as foreshadowings of something possibly gone or about to go awry.

By contrast, detected violations of hard system constraints serve as indications of something definitely gone awry because a hard root basis of the base system design is not being adhered to. In other words, and merely as an example here, if during day-to-day operations of system 203 it receives service requests from clients layer 210 exceeding C times CPUUmax (e.g., C=1000) then that will be treated as a state where something has definitely gone awry with respect to what the placement/capacity planning team designed. More specifically, and by way of example, perhaps a malicious denial of service virus has infected routing fabric 220 and has started pummeling system 203 with more service requests than it was designed to handle. In that case, an anomaly will be automatically declared and automatically alarmed system because a hard constraint of planned system 203 has been violated. As mentioned above, the planned system 203 will often have a margin of safety built into it such that its capacity is actually say, 111% of C times CPUUmax (in other words, the maximum of the load of layer 210 is 90% of the maximum of the capacity of layer 240 and the maximum of the load of layer 240 is 90% of the maximum of the capacity of layer 230). Accordingly, the alarm will often be generated even before catastrophic failure occurs either at the virtual components layer 240 or at the physical components layer 230.

Magnified graph 211 of FIG. 2A serves as an example of how root presumptions for the capacity and placement planning process (288) may take shape. The horizontal axis may indicate frequency of occurrence while the vertical axis indicates a measureable performance parameter such as per-client CPU bandwidth or CPU utilization percentage. The present disclosure is not limited to these and they are merely exemplary options. Other measureable performance parameters may include, per-like-component (e.g., per-client) I/O bandwidth, per-like-component power consumption, per-like-component power consumption density (e.g., watts per unit of physical area or volume), per-like-component memory utilization, per-like-component memory utilization density, per-like-component hard drive utilization, and/or any such further physical or virtual resource utilization metrics.

The placement/capacity planning process 288 can specify hard minimum constraints (e.g., the per-certain-kind-of-client Min value depicted in magnified graph 211) as well as or in place of hard maximum constraints. For example, certain ones of the clients of layer 210 may be designed to function as automatically repeating pingers of the routing fabric 220 and/or of the virtual components layer 240 where these automatically repeating pingers send test signals from different geographic or other locations on one side of the routing fabric 220 and through different routing paths for receipt by like, specialized testing components in layer 240 on the other side of the routing fabric 220. In such an exemplary design, there would be a hard requirement for a corresponding minimum CPU utilization by the pingers and the targeted recipient VM's (e.g., as represented for example by MIN.VM2.4 in magnified graph 211 of FIG. 2A). Thus a violation of a designed-in minimum level (e.g., MIN.VM2.4) of activity for pre-planned components of overall system 200 would be automatically declared (by automated section 250) as an anomaly and alarmed as such. More specifically, just as the sum of all instantaneous data processing unit utilizations (e.g., CPUU(VMk.m)) in the pre-planned overall system 200 or subsystem 203 should not exceed the sum of all data processing unit maximum utilizations (e.g., Max(VMk.m)) respectively of the overall system 200 or subsystem 203, the sum of all data processing unit utilizations in the pre-planned overall system 200 or subsystem 203 should not be less than the sum of all data processing unit minimum utilizations (e.g., Min(VMk.m)) respectively of the overall system 200 or subsystem 203. These basic limits on summed performances and summed corresponding constraints (or otherwise aggregated performances and correspondingly aggregated constraints) may apply to other types of constraints (e.g., memory utilizations, power consumptions, etc.) and or to further subdivisions of the overall system 200 or subsystem 203. By first summing (or otherwise aggregating) at the global level and testing for violation of the corresponding placement/capacity planning constraints (e.g., minimums and/or maximums and/or binary presence or exclusion), a quick test is provided for determining whether testing at finer levels of resolution is needed. An example of testing at finer levels of resolution was given above by way of the bifurcated or otherwise fractionated portions of the fans part of the overall system 200 or subsystem 203. Also, as mentioned, violations testing is not limited to numerical ranges. If the placement and planning process 288 specifies a certain number of operating SERDES cards has to be present and each must be of a specified model or type and one or more of the specified kind is missing or too many are included, that would be a violation of a placement/capacity planning constraint and it would alarmed as being an anomaly. (It is within the contemplation of the present disclosure to have different levels of alarms and for the placement/capacity planning process 288 to specify corresponding alarm levels for respective violations of placement/capacity planning constraints.) The CAP planning process 288a may specify that no other kind of SERDES card be present and in that case, presence of an unauthorized card would be flagged as a violation of constraints. Of course, these concepts are not limited to just fans and/or SERDES cards and extend to various other kinds of system components, be they physical or virtual.

In FIG. 2A, item 288 represents a relational database into which the knowledge of the CAP planning process 288a is stored in an organized manner. It may be in the form of a knowledge base having knowledge base rules that define respective hard constraints and/or soft expectations (e.g., averages). Item 288' above line 270 represents a copy of, or a transferred version of item 288 where the above line 270 version of 288' is operatively coupled to an automated anomaly declaring and alarming portion 250 of the multi-server system 203. Exemplary determinations 255 occur within the automated anomaly declaring and alarming portion 250 and use the transferred/copied database 288' for fetching the appropriate CAP planning constraints. The anomaly declaring and alarming portion 250 is operatively coupled to layers 230 and/or 240 for obtaining the current sums of resource utilizations and/or for obtaining current Boolean products of inverted XORings of resource inclusions versus corresponding capacity and placement planning requirements (where use of Boolean products of inverted XORs is explained below).

Referring next to FIGS. 1B and 2B, a side-by-side comparison is presented here with respect to how an anomaly might be declared in the situations of FIG. 1A using a regression analysis and deviation detect approach versus how an anomaly might be automatically declared and located in the situation of FIG. 2A using a planning violation approach.

The illustrated first step 150a in the hypothesized method 150' of FIG. 1B involves the day-to-day operations management team 160 of corresponding FIG. 1A implicitly ignoring, or not taking into account the capacity and placement planning process 185 carried out by the CAP planning team 180.

By contrast, the illustrated first step 250a in the method 250' of FIG. 2B involves the day-to-day operations management team 260 of corresponding FIG. 2A not implicitly ignoring, or not taking for granted the knowledge base 288 developed and recorded by the corresponding CAP planning team 280 as the latter carry out their respective capacity and placement planning process 285.

The second step 150b of FIG. 1B has the day-to-day operations management team 160 arbitrarily picking out as being "normal" a first time window (T1) for which they will do their regression analysis (153 of FIG. 1A). By contrast, the second step 250b of FIG. 2B has its respective day-to-day operations management team 260 (and/or an automated machine system portion 250 used by team 260) picking out a purposefully planned-for component Ai from the recorded knowledge base 288' of FIG. 2A where here, i can be a whole number in the range 1, 2, . . . N and where also here, N is the full count of components provided by the recorded knowledge base 288. In a variation of step 250b, rather than picking out just one purposefully planned-for component Ai, a group of like-in-kind components Σ Aik (where here k is a constant parameter identifying the "kind" of component while i varies to cover the set components of specific kind k within the system or fraction of the system that is being tested. It is easier to first consider the case where just one component Ai is being picked in step 250b. The concept of a summation of (or of another form of aggregation for) all like-in-kind components Aik will be clearer when step 250e is described below.

Step 150c of FIG. 1B has the day-to-day team 160 picking out on a semi-arbitrary basis, a metric that is to be observed; say CPU utilization (also denoted here as "cpuu") and also picking out on a semi-arbitrary basis, a sampling rate for the picked metric (cpuu). By contrast, the third step 250c of FIG. 2B has its respective day-to-day team 260 (and/or an automated machine system used by team 260) picking out a purposefully planned-for constraint (or "bound") Bj for the picked component Ai, where the picked constraint Bj comes from the recorded knowledge base 288' of FIG. 2A and where here, the lower case J can be a whole number in the range 1, 2, . . . M and where also here M is the full count of constraints for the given component Ai as provided for by the recorded knowledge base 288'. In a variation of step 250c, rather than picking out just one purposefully planned-for constraint Bj for picked component Ai, plural groups of like-in-kind constraints Bjk' can be picked for a group of like-in kind components Σ Aik (where here k' is a respective constant parameter for each group of like-in-kind constraints Bjk' and k' identifies the "kind" of constraint, but because a matrix of the different constraints is picked for the individual components Ai of same kind k while k' varies to cover the set of different kinds k' of constraints, a full matrix of different constraints can be tested in parallel for each like-in-kind component Aik. It is easier to first consider the case where just one constraint Bj of just one pre-picked component Ai is being picked in step 250c. The concept of a matrix like parallel testing of all like-in-kind constraints Bjk' for the respective summations of all like-in-kind components Σ Aik will be clearer when step 250e is described below.

Step 150d of FIG. 1B has the day-to-day team 160 picking out on a semi-arbitrary basis, the assumed-to-be causally-connected driving variables that are assumed to drive the behavior of the picked, driven metric (e.g., cpuu). Here, the day-to-day team 160 does not know for sure whether they have indeed picked the causally-connected driving variables or if they have picked enough of such variables (e.g., all of them). For example, the day-to-day team 160 might presume that the number of currently online system users is a variable that causally-drives the to-be-observed metric (e.g., cpuu) and that this presumed number is a valid predictor of what is "normal" in terms of consequential CPU utilization (cpuu). However, they easily could be wrong. Perhaps it is the number currently online "power" users rather than just general skill users that is a more accurate predictor of what consequential CPU utilization (cpuu) is to be expected as being "normal". This is merely an example. The point is that day-to-day team 160 is merely guessing. There is no scientific basis for picking the to-be-correlated to driving variables of the X and Z axes in window 153 of FIG. 1A in conjunction with the picked driven factor. Illustrated step 150e highlights the arbitrariness of the process. An arbitrarily picked sampling rate is used during an arbitrarily picked sampling period T1 to observe and record a semi-arbitrarily picked driven metric (e.g., cpuu) and its presumed number of driving predictors (e.g., all general purpose online users).

The arbitrary foundations of FIG. 1B do not stop there. In step 150f an arbitrarily picked regression method is used to create a "normal" plot or surface 154 whose shape constraints (e.g., linear, piecewise linear, power series, etc.) are arbitrarily picked. Then in steps 150g-150i an arbitrarily picked deviation 158 from the assumed to be "normal" plot or surface 154 is called out as an anomaly if it happens in an arbitrarily picked, next time period T2. There is no basis for defining time period T1 as "normal" and other time period T2 as "suspect".

By contrast, in the method 250' of FIG. 2B, essentially all selections have a purposeful basis. In step 250d, each component Ai of either the whole multi-server system (or of a fractional portion of the system then being considered) is tested one way or another for violation of one or more of all its purposefully attached constraints Bj. Any deviation from the planned constraints (e.g., boundaries) of the design 288 of process 285 (FIG. 2A) is by definition an anomaly relative to that design 288. Not all anomalies may be worthy of immediately setting an alarm for. However, that is a different question from the one of how to declare something as being an anomaly in the first place. In FIGS. 1A-1B it is done mostly on the basis of sheer guess work. In FIGS. 2A-2B it is done mostly on the basis of careful component capacity and placement planning.

Referring to optional step 250e of FIG. 2B, rather than testing each component Ai one at a time against each of its respective constraints Bj, it is possible to group same components; say same virtual machines (VM's) together, add up the respective and observed same parameter (e.g., CPU utilization) of the grouped together same components and test that summed set of observed behaviors against the corresponding sum of a same constraint. More specifically, in FIG. 2A the example 255 is given of automatically testing for a violation of Σ CPUU(VMk.m)≤Σ Max(VMk.m) for each respective kind k of VM and all m of that kind within the whole of the system. If there is a maximum CPUU value as a constraint for each VM of a specified kind k, then the sum at a given time point of the observed CPUU's of all m VM's of kind k should not exceed m times that specified maximum CPUU value. If the sum is in excess of that product (m times Max(VMk)) then at least one of the watched VM's of kind k has violated its planned constraint. The same will hold true for planned minimums as it does for planned maximums. If the placement and planning process 288 dictates that no VM of kind k=5 (for example) is to have a CPUU of less than 3% (for example) and somehow the observed sum of CPUU's for all m virtual machines of kind k=5 is less than m times 3%, then at least one of the watched VM's of kind k=5 has violated this planned constraint. In other words, violation of Σ CPUU(VMk.m)≥Σ Min (VMk.m) is by definition an anomaly.

Once it is determined that there is a violation of a globally summed (or otherwise globally aggregated) constraint within the whole of the system, the location of that violation can be homed in on by testing respective halves or other fractional portions of the system as already described above. Incidentally, it is to be understood that summation is not the only collective test usable in accordance with the present disclosure. If a given constraint is a binary one (e.g., yes or no, is SERDES card present in slot 12 of each shelf of each rack?), then a Boolean product of the expected yes for compliance with each respective binary constraint will indicate if there is at least one violation in a string of such constraints. The Boolean product string (which is another form of compliance aggregation) can be cut into halves, then quarters, etc. and each segment can be tested until the point of constraint violation is isolated to a desired level of location resolution (e.g., to the level of a hot swappable unit). A compliance indicating signal can be generated by inverting the exclusive OR (XOR) of an observed status within a respective sampling area of the machine system with the required status as specified by the capacity and placement planning specification for that respective sampling area. As a more specific example, if the CAP planning specification for each slot number 5 of each rack shelf is the presence of a type number 7 I/O card and a respective status reporting bit is logic "1" only if the type number 7 I/O card is present and operational while a corresponding CAP planning requirement bit is logic "1" only if the type number 7 I/O card is required to be present and otherwise it is "0" if the type number 7 I/O card is required to be absent, then an XOR of the status reporting bit with its corresponding CAP planning requirement bit will be a "0" if there is a match between requirement and actuality. A logical inversion of such an XOR result (and XOR-NOT) will be a "1" if there is a match between requirement and actuality. A Boolean product of respective XOR-NOT match determinations will be a logic "1" if all binary requirements and actualities match, otherwise it will be a "0". By taking Boolean products of subdivided fractions (e.g., halves, quarter, etc.) of strings of respective requirement compliance bits (XOR-NOT match determinations), the location of a compliance violation can be isolated to a desired degree of resolution and thereafter fixed with appropriate action (e.g., removing the wrong card type or nonoperational card from the slot and swapping in the right type of operational card).

Aside from testing for violation of hard capacity and placement planning constraints, the present disclosure contemplates also testing for deviation from planning "expectations". This is somewhat similar to the deviation from "normal" depicted by step 150i of FIG. 1B except that for the system of FIGS. 2A-2B, the "normal" is a planned-for normal rather than a regression-wise, guessed at normal. More specifically and by way of example, suppose that the CAP planning process 285 specifies a CPU utilization value (cpuu) of Avg.VM2.m (e.g., 20%) for all virtual machines of kind k=2 in layer 240 of FIG. 2A. In that case the "expected" average cpuu value for all kind k=2 VM's in layer 240 should on average be M2 times Avg.VM2.m (in other words, the sum of all the expected individual cpuu averages). If there is a marked deviation from this expected sum (or other form of appropriate aggregation) then that may indicate on a weaker level (weaker than hard constraint violations) that something in the system is not as expected. A historical trend may be plotted and if the deviation from the expected sum (or other form of appropriate aggregation) of averages keeps growing in a same direction day after day (or week after week), an alarm may be automatically generated in accordance with the present disclosure to indicate that there is a continuously growing deviation from planning expectations. This may be something that the day-to-day operations management team 260 might want to look at.

Referring to step 250J of FIG. 2B, and also to the juxtaposed step 150J of FIG. 1B, in the case of FIG. 2B there is a definitive and purpose-based yes or no answer to the test carried out in step 250J; namely, has a violation of planned constraint Bj by planned component Ai been found? By contrast, there is no definitive and purpose-based yes or no answer to the test carried out in step 150J of FIG. 1B because the "normal" of step 150J is merely a floating guess (which could change each time a new regression 153 is run) and the deviation from this floating "normal" is also a guessed at number that has no physicality-base functional foundation behind it.

The questionable logic of the process 150' of FIG. 1B can be seen more quickly in the case where the answer to test 150J is yes, the "abnormal" deviation from the floating "normal" has been spotted. Then in next step 150k an anomaly is declared but no information is present for determining the location of the root cause of this declared "anomaly". As a consequence, in step 150m the day-to-day operations management team 160 has to guess as to what anomaly isolation technique they should try and use for isolating the root cause of the questionably declared "anomaly" of step 150k. Then in step 150N, they try to supposedly "fix" the assumed root cause of the questionably declared "anomaly" of step 150k. However, the supposed "fix" of step 150N might instead be creating a problem (a fault) that was not there beforehand, thus making matters worse rather than better.

For sake of completion of the description of process 150' of FIG. 1B, after a supposed "fix" is implemented in step 150N, another anomaly-indicating (perhaps) metric (e.g., memory utilization) is picked and the string of arbitrary guesses repeats from step 150b. On the other hand, if test step 150J produced a "No" result (which is just as questionable as a Yes result), control is passed to step 150L wherein a next time period (after T2) is picked as being "suspect" rather than a supposedly normal window and control is passed to step 150i for repeat of the deviation detection step 150J.

In the case of FIG. 2B and in contrast to the driven-metrics/driving-inputs/others guessing game of steps 150c, 150d, 150f, 150g, etc. of FIG. 1B, if no definitive constraint violation is detected in step 250J of FIG. 2B, then the process proceeds methodically to the next constraint, B(j+1) in the list of all constraints provided for component Ai until the pre-planned list of constraints for that component Ai is exhausted, as is indicated in step 250L. In the case of exhaustion of the constraints list in step 250L, control is passed to step 250m where the next in a methodical list of planned-for components A(i+1) is selected. Then the process is repeated from step 250b down until the list of planned-for system components is exhausted. If all components Ai and all their planned-for constraints Bj is found to have been exhausted in step 250N then control passes to step 250o wherein the i, j and k parameters are reset and a wait is taken until the next convenient time when the process from step 250b is repeated.

For sake of completion of the description of process 250' of FIG. 2B, if in step 250J a definitive violation of a pre-planned constraint Bj of an already identified component Ai is detected, then control passes to step 250p. In the case where testing is being conducted on an en-mass aggregated basis (e.g., arithmetic sum of analog and respective constraints of alike components or Boolean product of binary XOR-NOTs for respective requirements and observed actualities of alike components), the halving or other subdivision of the system into appropriate fractions and repeat of test on each fraction may be carried out (see step 250R) until the location of the constraint violation is resolved to a desired level of resolution (e.g., to a hot swappable box or card level). At the same time the alarm may be activated in step 250R.

In some embodiments, not all constraint violations are deemed worthy of immediate alarm generation. For example, some types of constraint violations may be assigned relatively low "weights" (much less than 100%) such that alarming is not warranted for them until there have been more than a few of such violations detected within a predetermined duration (e.g., a 24 hour period) where an over-time decay of the added together weights is one option that may be further implemented. In such cases control is passed from step 250p to step 250Q and the assigned weight of the detected but not critical constraint violation is added to an appropriate and optionally over-time decaying subtotal column. If the subtotal then equals or surpasses 100%, control is returned to step 250p and thereafter the corresponding alarm is generated. On the other hand, if in step 250Q the subtotal does not exceed its threshold, control is passed to step 250k for testing of the next constraint B(j++) in the list.

By the time the process 250' gets to step 250s, the location of the declared anomaly (a definitive constraint violation)

has been determined to the desired level of resolution (e.g., to a hot swappable box or card level) and therefore the isolated and definitive root fault (namely, a constraint violation) can be fixed in step 250s. At the same time or after, control is passed to step 250k for testing of the next constraint B(j++) in the list.

Although not emphasized in the description of process 250' of FIG. 2B, all or most of the steps are preferably carried out by a machine-implemented automated process so that human error is not a factor. In other words, complete lists of critical ones of capacity and placement planning constraints and/or requirements are provided by an automated process and the lists are methodically stepped through by a machine-implemented and automated constraint-to-observed actuality testing process such that it is automatically and repeatedly verified that all critical ones of capacity and placement planning constraints and/or requirements are being complied with. If not, an appropriate alarm signal is generated and an automated alarm-response follow-up process (not shown) assures that an appropriate response is timely taken for each alarmed situation.

Given that the day-to-day operations management portion 265 of system utilization will employ automatically repeated constraints testing (e.g., $\Sigma$ CPUU(VMk.m)$\leq\Sigma$ Max(VMk.m) for all k and all m; or for subsets of k and/or m), it is also part of the present disclosure to manually and/or automatically record all the constraints (or at least all the operations-critical constraints) of the placement and planning process 288 in a test-friendly manner. More specifically, and referring to FIG. 3, a test-friendly capacity and placement planning data record 300 may be configured as hierarchically organized supersets and subsets. The recorded data record 300 may be subdivided firstly in accordance with constraint type (e.g., 302, 305, . . . ) and then in accordance with system layer (e.g., 310, 340, . . . ) and deeper down in accordance with layer bifurcations (e.g., 320, 330, . . . ) and/other fractionations where the fractionations may be used for location finding down to a desired degree of resolution.

More specifically, a first capacity and placement planning constraint type 302 might be data transmission rates. In one embodiment, record row 302 not only includes a definition of the corresponding constraint type (e.g., Data Transmission Rates) but also linked list pointers to other associated record rows, for example a first pointer 302a to a next peer level record row 305 (e.g., Constraint Type=Data Storage Amount) and a second pointer 302b to a hierarchically next level below record row 310 (e.g., Transmission Type=Egress). The hierarchically next below records (a.k.a. child records) such as the one shown in row 310 can have plural hierarchical categorizing attributes, for example in addition to specifying that the Transmission Type is "Egress", it might specify that its included constraints apply Clients Layer (more specifically, a clients of type 1 layer such as layer 210 of FIG. 2A). Yet more specifically and in one embodiment, the given major constraint type (e.g., Data Transmission Rates) is subdivide-able into at least three subtypes, namely, an ingress-to-specified-layer subtype, an egress-from-specified-layer subtype, and a combined ingress-and-egress subtype (where the specified-layer could be one of the major system layers 210, 220, 230, 240 of FIG. 2A). Each subtype record may include its own definitions of respective attributes and may also input linked list pointers (e.g., 302a, 302b) such as to the next peer level record and to the next below child level (as well as optionally back up to the parent level record row, i.e. where 302 is a parent of record row 310). More specifically, and as an example, record row 310 may identify itself as providing min/max and/or other data transmission rate constraints for the whole of the clients layer 210 (FIG. 2A) where the subtype of transmission is ingress-to-the-specified-layer (e.g., to 210). Aside from the planned Maximum and Minimum ingress type data transmission rates for the to/from-specified-layer (e.g., 210), record section 310 may specify an expected Average rate. Additionally, it may assign an anomaly declaration weight for the case where a violation is detected and optionally a corresponding decay rate for the weight if posted to an appropriate weights-subtotaling column. It may also specify an associated alarm level that corresponds to a predetermined criticality weight for violation of the constraint. Record section 310 may include yet other specifications associated with the planned egress type data transmission rates (e.g., specific channels or locations from which these egress type data transmissions may emanate or not emanate). The linked list pointers to next peer and next child may be used for hierarchically stepping through record levels to isolate the location of associated violation as will be appreciated when step 415 of below described FIG. 4 is discussed.

Under major section 310 there may be two record subsections, or hierarchical child records, 320 and 330 that provide pre-planned or pre-calculated min/max and/or other data transmission rate constraints for respective parts (e.g., left half and right half) of the whole of the clients layer 210 of FIG. 2A.

Major section 340 is a peer of record row 310 and provides, as a further example, planned Maximum and Minimum Egress type data transmission rates for VM's layer 240. Under major section 340 there may reside, as further examples, two record subsections or hierarchical child records, 350 and 360 that provide pre-planned or pre-calculated min/max and/or other data transmission rate constraints for respective parts (e.g., left half and right half) of the whole of the VM's layer 240. Below each of the halved sections, there may be provided like specifications (not shown) for corresponding quarters of the layer and so on. The record 300 is set up so that time for testing need not be consumed by determining or calculating the pre-computable test values for the currently summed data transmission Min/Max rates for the respective major layers and the layer subsections (e.g., left and right halves).

FIG. 3 further shows more examples of other possible constraint types as peers of major record row 302. More specifically, shown is a data storage capacities specifying row 305 (with layer and sublayer record sections understood to be hierarchically organized beneath it or logically linked to it); a power consumption densities specifying row 306 (again with layer and sublayer record sections understood to be hierarchically organized beneath and pointed thereto by linked list pointers—not shown); a coolant flow rates specifying row 307 (which could be fan driven air flows or other fluids); a compartment temperatures specifying row 308, and so on. In short, everything or at least the operations-critical constraints that re specified in the capacity and placement planning database 288 for defining a fully operational system 201/203/200, including electrical specifications, thermodynamic specifications, physical placement specifications, test specifications, software process specifications, data transmission specifications, and so on are recorded in a test-friendly and hierarchically organized manner in the copied database 288' so that the necessary (and/or all) constraints for all (or at least the necessary components and layers) may be efficiently walked through when automatically testing for constraint and requirement violations.

Referring to FIG. 4, shown is a flow chart for a machine-implemented and automatically and repeatedly carried out, violation detecting process 400 in accordance with present disclosure and usable with the hierarchically organized record structure of FIG. 3. Process 400 may be implemented within section 250 of the illustrated machine system of FIG. 2A where the tested for constraints and requirements are specified in the copied (or transferred) database 288'.

In step 402 of FIG. 4 a major constraint type (e.g., data transmission rate, data storage capacity, data storage read/rate speed, etc.) is selected, for example by walking through a linked list or the like and according to the top peer records that start for example with record 302 of data structure 300 (and then continues to 305, 306, etc.).

In step 403 if applicable, a corresponding subtype of the selected major constraint type is selected; for example, ingress or egress or both as a type of data transmission. Other selected types may include, volatile and/or nonvolatile as types of data storage, removable and/or non-removable, hot-swappable or not, backed-up or not, and so on.

In step 410 a major system layer is selected; for example one of layers 210, 220, 230 or 240 of FIG. 2A. Even database 288' may be checked for compliance with capacity and placement planning specifications.

In step 411 if applicable, a corresponding component subtype of the selected layer is selected; for example, type 1 or type 2 or all clients, kind 1 or kind 2 or all of virtual machines, and so on.

In step 412 and given the selections made beforehand (in steps 402-411) an aggregation of (e.g., a sum of) then observed samples for the selected parameter (e.g., data transmissions for all selected components) is generated and tested for a possible violation of the corresponding capacity and placement planning process constraints (e.g., maximum and/or minimum). If there is no violation found, further selection is successively made by way of step for the next layer subtype until that class is exhausted, for the next major layer until that class is exhausted, for the next constraint subtype until that class is exhausted, and for the next constraint until that class is exhausted with repeat of appropriate ones of steps 402-411. Then the process is automatically repeated starting with the top of record structure 300 and step 402 of FIG. 4.

Although illustrated step 412 depicts just a testing for violation of Min and/or Max constraints, it is within the contemplation of the present disclosure to test for compliance with binary, ternary or higher order discrete requirements. An example of compliance with binary discrete requirements was given by way of the above described Boolean product of XOR-NOT results. In the case of ternary specification within the capacity and placement planning database 288', such may encompass don't-care states. More specifically, if the required I/O card type is number 1007 but the slot it is placed in is a don't care as long as there is one such card in each rack, then the compliance test will allow for a don't-care as long there is one (or another specified number) in the tested rack. In one embodiment, respective knowledge base rules may be specified for each area or subarea of a compliance-tested system and the output of the knowledge base testing can be a simple yes, it does comply or no, it does not comply and here are the corresponding non-compliance parameters (e.g., weight, decay rate, alarm type, etc.).

If step 412 indicates a constraint violation, the location of that violation is determined to a predetermined level of resolution by subdividing and then again subdivided as indicated in steps 420-430. When the desired level of location and/or component resolution is achieved in step 440, the location of the anomaly is identified and the corresponding alarm level is determined in step 442. Then appropriate signals are generated and transmitted for reporting the anomaly, its location and alarming the appropriate parties by way of step 445. Step 447 is an optional reaction follow-up process. It tests to see if the alarm was timely responded to and by which entity, and if not, it generates an additional alarm which it (447) follows-up on to assure that a responsible entity (human or automated one) appropriately reacts to at least one of the original alarm and the failure to timely respond to that original alarm.

The present disclosure is to be taken as illustrative rather than as limiting the scope, nature, or spirit of the present teachings. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated and taught here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Further, the functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "component," "block", "database", "agent" or "system." Furthermore, aspects of the present disclosure may take the form of a computer program product embodied in one or more non-ephemeral computer readable media having computer readable and/or executable program code embodied thereon.

Any combination of one or more computer readable media may be utilized. The computer readable media may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an appropriate electrical connection having one or more wires, a portable computer diskette, a hard disk, a random access memory (RAM), a read-only memory (ROM), an erasable programmable read-only memory (EPROM or Flash memory), an appropriate optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct/program a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The foregoing detailed description has been presented for purposes of illustration and description. It is not intended to be exhaustive or limiting to the precise form disclosed. Many modifications and variations are possible in light of the above teaching. The described embodiments were chosen in order to best explain the principles of the disclosed technology and its practical application, to thereby enable others skilled in the art to best utilize the technology in various embodiments and with various modifications as are suited to the particular use contemplated. It is intended that the scope be defined by the claims appended hereto.

What is claimed is:

1. A machine-implemented anomaly detecting process comprising:

accessing a pre-planned multiserver data processing system comprising a plurality of servers within which there are disposed a plurality of data processing units and a plurality of nonvolatile data storage units;

automatically accessing a pre-recorded capacity and placement planning specification (CAPP specification) for one or more operational layers of the accessed multiserver data processing system, where the operational layers include a physical resources layer comprised of the plurality of servers having disposed therein the data processing units and the nonvolatile data storage units, where the pre-recorded CAPP specification specifies respective CAPP requirements for one or more of a resource inclusion, a resource exclusion, a resource performance maximum, a resource performance minimum, a disallowed mode of operation and a required mode of operation at respective locations for respective predetermined ones or predetermined sets of components or kinds of components of the one or more operational layers including CAPP requirements for components of the physical resources layer;

while the multiserver data processing system is running within a pre-planned operational environment and for a given kind of component or a predetermined one or set of components and a corresponding one or more requirements specified for the given kind of or the predetermined component or predetermined components set in the accessed CAPP specification, identifying and testing operational attributes of the given kind of or component or components set as specified in the CAPP specification and further using the CAPP specification for automatically determining a planned-for location of the given kind of or component or components set to a predetermined level of location resolution and using the CAPP specification for automatically repeatedly determining whether the corresponding CAPP requirements are violated by a corresponding one or more of identified operational attributes of the given kind of or component or components set while the multiserver data processing system is running; and in response to an automatically determined requirements violation, automatically generating and storing a corresponding requirements violation report which identifies the detected requirements violation and identifies a location of the detected requirements violation to a specified degree of location resolution.

2. The machine-implemented process of claim 1 wherein: the determining of whether the corresponding one or more specified requirements are violated by a correspondingly identified operational attribute of the given kind of component or predetermined component or predetermined components set comprises determining whether the corresponding operational attribute exceeds a specified resource performance maximum for that operational attribute.

3. The machine-implemented process of claim 1 wherein: the determining of whether the corresponding one or more specified requirements are violated by a correspondingly identified operational attribute of the given kind of component or predetermined component or predetermined components set comprises determining whether the corresponding operational attribute is less than a specified resource performance minimum for that operational attribute.

4. The machine-implemented process of claim 1 wherein: the determining of whether the corresponding one or more specified requirements are violated by a correspondingly identified operational attribute of the given kind of component or predetermined component or predetermined components set comprises comparing tested-for inclusions and exclusions of resources at locations specified by the CAPP specification with the corresponding inclusions and exclusions of resources as specified by the CAPP specification for those locations.

5. The machine-implemented process of claim 1 wherein: the operational layers of the multiserver data processing system comprise a virtual components layer, and wherein components of the virtual components layer consume resources of the physical components layer.

6. The machine-implemented process of claim 5 wherein: the components of the virtual components layer each have respective operational requirements assigned to them by the CAPP specification.

7. The machine-implemented process of claim 1 and further comprising:
while the multiserver data processing system is running, automatically aggregating together predetermined subsets of the operational attributes observed in the running multiserver data processing system; and
automatically comparing the aggregated together subsets with correspondingly aggregated requirements of the CAPP specification.

8. The machine-implemented process of claim 7 wherein the aggregated requirements include specified maximums for corresponding operational parameters of same kinds of components.

9. The machine-implemented process of claim 7 wherein the aggregated requirements include specified minimums for corresponding operational parameters of same kinds of components.

10. The machine-implemented process of claim 1 and further comprising:
automatically generating a string of binary compliance indicators obtained from sensing in respective sample areas of the running multiserver data processing system, corresponding operational attributes, resource inclusions or resource exclusions and testing them against their respective requirements, the binary compliance indicators respectively indicating a logic true if there is compliance by respective ones of the corresponding operational attributes or inclusions or exclusions sensed in the sample areas with the corresponding requirements of the CAPP specification and respectively indicating a logic zero if there is noncompliance;
automatically generating a first Boolean product of the generated string of binary status indicators;
in response to the first Boolean product being a logic zero, automatically splitting the string into a plurality of sub strings and obtaining a respective second Boolean product of at least a respective one of the substrings so as to thereby better localize the cause of the first Boolean product being a logic zero; and
after better localizing of the cause for the first Boolean product being a logic zero, generating and storing a corresponding requirements violation report which identifies the detected requirements violation and identifies a location of the detected requirements violation to a specified degree of location resolution.

11. A pre-planned multiserver data processing system that is configured in accordance with a recorded capacity and placement planning specification (CAPP specification) and where the multiserver data processing system comprises:
a plurality of servers within which there are disposed a plurality of data processing units and a plurality of nonvolatile data storage units; and
a runtime anomaly declaring and alarming subsystem implemented as part of the pre-planned multiserver data processing system and configured to automatically and repeatedly compare against constraints defined in the CAPP specification, corresponding operational samples and resource inclusions and exclusions sensed during a running of the multiserver data processing system;
wherein the run time anomaly declaring and alarming subsystem is configured to automatically generate, in response to a determined constraint violation, a corresponding constraint violation report.

12. The multiserver data processing system of claim 11 wherein:
the anomaly declaring and alarming subsystem is configured to automatically assign respective weights to determined constraint violations; and
the anomaly declaring and alarming subsystem is configured to output alarm signals in response to determined constraint violations whose assigned weights exceed predetermined and corresponding thresholds.

13. The multiserver data processing system of claim 11 wherein:
the capacity and placement planning specification is hierarchically organized according to at least one of: constraint type, constraint subtype, a layer among operational layers of the multiserver data processing system and fractional portions of the operational layers.

14. The multiserver data processing system of claim 11 in a running operational state and in an operational environment that comprises plural client machines operatively coupled to the multiserver data processing system by way of a network and wherein:
the capacity and placement planning specification provides predefined constraints for components of at least one of the network and the plural client machines; and
the wherein the anomaly declaring and alarming subsystem is configured to automatically generate, in response to determined constraint violations by the network or the plural client machines, corresponding constraint violation reports.

15. The multiserver data processing system of claim 11 in a running operational state and in an operational environment that comprises plural infrastructure support components including power supplies and cooling devices operatively coupled to the multiserver data processing system to provide infrastructure support services to the multiserver data processing system and wherein:
the capacity and placement planning specification provides predefined constraints for the infrastructure support components; and
the wherein the anomaly declaring and alarming subsystem is configured to automatically generate, in response to determined constraint violations by the infrastructure support components, corresponding constraint violation reports.

16. A capacity and placement planning and using process for planning capacity and placement of components of a to-be-implemented multiserver data processing system and for thereafter using results of the capacity and placement planning (CAPP) to isolate operational anomalies in an operating version of the multiserver data processing system, the process comprising:
defining respective operational constraints and at least one of resource inclusions and exclusions for planned components at correspondingly planned for locations of the to-be-implemented and operated multiserver data processing system;
recording the defined operational constraints and resource inclusions and/or exclusions in a constraints specifying database that is hierarchically organized such that the defined operational constraints and resource inclusions and/or exclusions can be matched to corresponding components at correspondingly tested locations of the multiserver data processing system; and
providing querying access to the constraints specifying database to an anomaly declaring and alarming subsystem of the implemented and operating multiserver data processing system, where the anomaly declaring and alarming subsystem is configured to automatically and repeatedly, during said operating of the multiserver data processing system, compare against constraints defined in the accessed CAPP-based database, corresponding operational attributes and resource inclusions and/or exclusions sensed at the correspondingly tested locations of the operating and implemented multiserver data processing system thereby enabling the anomaly declaring and alarming subsystem to test for violation at the correspondingly tested locations of their corresponding CAPP-defined constraints.

17. The process of claim 16 wherein the implemented multiserver data processing system comprises plural layers including a physical components layer and a virtual components layer, where the virtual components consume resources of the physical components layer, and wherein:
the constraints specifying database is hierarchically organized to define respective operational constraints of the physical components layer and of the virtual components layer.

18. The process of claim 16 wherein:
the constraints specifying database is configured to include pre-aggregated constraints selected so that automatically aggregated together predetermined subsets of operational samples observed in a running of the multiserver data processing system can be compared with correspondingly pre-aggregated ones of the constraints of the constraints specifying database.

19. The process of claim 18 wherein:
the pre-aggregated constraints are those of predetermined fractional portions of the operational layers of the running of the multiserver data processing system.

20. The process of claim 16 wherein:
the constraints specifying database is configured to include identifications of selected strings of binary status indicators to be obtained from sensing respective sample areas of the running multiserver data processing system, the binary status indicating samples of the identified strings respectively indicating a logic true if there is compliance by respective ones of the sensed sample areas with corresponding requirements of the capacity and placement planning specification and a logic zero if not, whereby a Boolean product of the binary status indicators of one of the identified strings will be a logic one if there is no requirements violation in the respective sample area of the one string and the Boolean product will be a logic zero if there is a requirements violation in the respective sample area; and
the process automatically produces respective Boolean products of the binary status indicators of respective ones of the identified strings so as to thereby determine if there is a requirements violation and to identify the sample area in which the requirements violation occurs.

21. A computer program product comprising:
a non-transitory computer readable storage medium having computer readable program code embodied therewith, the computer readable program code comprising:
computer readable program code configured to cause a corresponding data processor to obtain respective operational constraint definitions from a predetermined capacity and placement planning specification (CAPP specification) of a pre-planned multiserver system;
computer readable program code configured to cause a corresponding data processor to automatically match the obtained operational constraint definitions of the CAPP specification with correspondingly sensed operational attributes of the pre-planned multiserver system while the latter runs in a pre-planned operational environment; and
computer readable program code configured to cause a corresponding data processor to automatically detect noncompliance by one or more of the sensed operational attributes of the running multiserver system with their matched operational constraint definitions as specified in the CAPP specification.

22. The computer program product of claim 21 wherein:
the computer readable program code that is configured to cause the corresponding data processor to detect non-compliance is further configured to cause the corresponding data processor to generate an aggregation of selected ones of the corresponding operational attributes and to compare the aggregation against a pre-calculated aggregation of the corresponding operational constraint definitions of the CAPP specification.

23. The machine-implemented process of claim 1 wherein the pre-recorded CAPP specification specifies respective CAPP expectations for one or more of resource performance attributes at respective locations for respective kinds of components or predetermined sets of components of the one or more operational layers and the process further comprises:
while the multiserver data processing system is running within a pre-planned operational environment and for a given kind of component and a corresponding one or more expectations specified for the given kind or component set in the accessed CAPP specification, identifying and testing resource performance attributes of the given kind or component set that have expectations specified for them in the CAPP specification, the specified expectations including at least one of an expected average value for the corresponding resource performance attribute, an expected median value for the corresponding resource performance attribute, an expected maximum for the corresponding resource performance attribute and an expected minimum value for the corresponding resource performance attribute, and further while the multiserver data processing system is running within the pre-planned operational environment, using the CAPP specification for automatically repeatedly determining whether and the extent to which the corresponding CAPP expectations are deviated from by a corresponding one or more of the tested resource performance attributes of the given kind or component set; and
in response to an automatically determined expectations deviation beyond a predetermined threshold, automatically generating and storing a corresponding expectations violation report which identifies the detected expectations deviation and identifies a location of the detected expectations deviation to a specified degree of location resolution.

* * * * *